Patented Jan. 4, 1944

UNITED STATES PATENT OFFICE 2,338,099

ALKALI-RESISTANT GLAZE

Alden J. Deyrup, Westfield, N. J., assignor to E. I. du Pont de Nemours & Company, Wilmington, Del., a corporation of Delaware No Drawing. Application December 1, 1941, Serial No. 421,245

20 Claims. (Cl. 106—49)

This invention relates to the decoration of the surfaces of glass and ceramic ware by the use of low-melting glazes, which glazes may be pigmented and/or opacified. Although generally useful in the decoration of all types of ceramic surfaces, the invention is especially useful for the decoration of the surfaces of glassware articles. The invention disclosed in this application is in part, a continuation of that disclosed in my copending patent application Serial No. 336,415, filed May 21, 1940, now Patent No. 2,278,868.

The surfaces of glass and ceramic articles are frequently decorated by melting thereon a glaze composition. This glaze composition is usually pigmented by the addition of a ceramic pigment, and may or may not also contain an opacifying agent. The glaze composition, which is also termed a "color" in this art, must be one which will melt and form an adherent coating at a temperature below that at which softening or deformation of the glass or ceramic article decorated would occur. It is in this special field of low-melting glaze or enamel compositions, melting to form a glossy adherent coating generally below 1150° F., particularly useful for the decoration of articles of glassware, that the novel compositions with which this invention is concerned find their principal utility.

The art of decorating glassware by the application thereto of a low-melting glaze composition, ordinarily known as a glaze or color, has been practiced for a number of years. Among the glaze compositions suitable, melting below about 1150° F., it has been customary to employ the silicates and the borosilicates of lead. These compositions ordinarily melt at temperatures below those at which danger of injury to the glass articles being decorated by softening or deformation would occur. They can therefore be utilized in the decoration of glassware surfaces by melting the glaze compositions thereon. The low-melting borosilicates of lead are ordinarily prepared by melting together an oxide of lead, boric acid and silica in such proportions as to yield a glaze composition having a suitably low melting point. The low-melting lead silicate glazes, which usually have somewhat higher melting points than the lead borosilicates, are usually prepared by melting together an oxide of lead and silica, in suitable proportions, together with an alkali metal oxide such as the oxides of sodium, potassium, or lithium.

While the presence of boron in the lead borosilicate glaze compositions, the boron usually being introduced as boric oxide or some compound yielding boric oxide during the melting such as boric acid, has been desirable from the point of view of lowering the melting point, its inclusion has resulted in a substantial lessening in the resistance to acids and alkalies of the glaze compositions and of the resulting glossy decorative surfaces. Various attempts have been made to secure glaze compositions which would possess satisfactory low melting points but would, nevertheless, have greater resistance to the action of chemical agents such as acids and alkalies. Generally, it has been necessary to sacrifice melting point in order to obtain increased resistance, the resistance of any glaze composition to chemical action ordinarily increasing as the fusion point of the composition increases. In order to obtain superior resistance to the action of chemical agents such as the alkalies, it has been necessary in the art to prepare compositions having relatively high melting points, the melting points in some instances being so high as to prevent or seriously restrict the utilization of the glaze compositions in the decoration of glassware surfaces. Glazes of relatively low melting point, such as some lead borosilicate glazes, on the other hand, are soluble to a substantial extent even in water.

Recently the decoration of glass milk bottles by the melting thereon of a low-melting glaze composition has been commercially practiced to a substantial extent. When glass milk bottles are returned to the dairy for further use it is customary to wash these bottles in a hot solution containing considerable quantities of caustic. This alkali has been injurious to the colored decoration on the milk bottles, the usual types of low-melting glazes not possessing sufficient resistance to the action of alkalies to render the useful life of the milk bottles more than that of a relatively few washings. In order to prolong the active life of these bottles, it has become increasingly evident that the colored decoration would have to be secured by the use of a glaze composition having greater resistance to the action of alkalies than those low-melting glazes now known to the art.

Increased resistance to chemical action, particularly to the action of alkalies, must be attained, however, without substantially elevating the melting point of the glaze composition applied to the glass bottles or other glassware. As previously specified, softening of most glassware articles occurs at temperatures around 1100° F., or even, in some cases, at temperatures below 1100° F., such as 1000° F. This means that for decorating most glassware surfaces the glaze compositions must possess fusion points not in excess of 1100° F. Glass milk bottles, because of their substantial thickness, may be regarded as an exception to this general rule, however, the softening temperature of such milk bottles being frequently in excess of 1100° F. Accordingly, my invention includes the preparation of compositions for decorating glassware which possess fusion points up to about 1150° F., as such decorating compositions can frequently be used in the decoration of some types of glassware such as glass milk bottles and other articles of relatively thick glass. As previously stated, the general resistance of a glaze for decorating glassware and of the resulting decoration on the glass article decorated increases as the fusion point of the glaze composition increases.

In my previously referred to copending patent application Serial No. 336,415, now Patent No. 2,278,868, I have disclosed low-melting lead glaze compositions of increased resistance to the action of alkaline agents, which compositions are prepared by fusing and fritting a batch mixture comprising lead oxide, silica, boric oxide, zirconium oxide, and one or more of the oxides of the alkali metals having an atomic weight below 40. This group of alkali metal oxides includes those of the metals lithium, sodium, and potassium, all these metals having atomic weights below 40. The zirconium oxide is melted into the glaze composition to form a clear homogeneous solution with the other ingredients comprising the flux. These glazes are characterized by increased resistivity to the action of alkalies without undue elevation of their maturing temperatures. There is, however, a definite limit to the increase in the resistivity of these glazes to alkaline agents that can be secured without unduly increasing their coefficients of expansion. Since the glazes are intended for application to glassware surfaces, the coefficient of expansion is fully as important as the melting point (maturing temperature), and increased alkali resistance cannot be secured at the expense of too great an increase in the coefficient of expansion.

The glazes with which this invention is concerned are an improvement over those of my copending patent application, and are characterized by enhanced alkali resistance without sacrifice in maturing temperature and without undue increase in the coefficient of expansion. They are also characterized by improved stability with the cadmium colors when red decorative coatings are produced by the use of the cadmium selenide and cadmium sulfoselenide ceramic pigments, as compared with enamel compositions now known to the art.

My improved glaze compositions may be prepared from batch compositions yielding lead oxide, silica, zirconium dioxide, and one or more of the alkali metal fluorides of those alkali metals having an atomic weight below 40. This group includes the fluorides of the alkali metals lithium, sodium, and potassium. The refractory oxide zirconia is melted into homogeneous solution in the low-melting enamel. In addition, there may be present one or more of the alkali metal oxides, particularly the oxides of those alkali metals having an atomic weight below 40, and, if desired, boric oxide in amounts up to 10% by weight based on the total weight of the composition.

Low-melting glazes having this composition are characterized by superior alkali resistance without an unduly great coefficient of expansion. Moreover, they possess improved stability with certain types of pigmentary agents. They are also less susceptible to reduction, darkening, or blistering by the carbonaceous residues of organic application media than are previously known glaze compositions. This is a distinct advantage when the squeegee process is utilized for applying the glaze composition to articles of glassware to be decorated, and the superior stability with the cadmium colors permits the securement of brighter and more satisfactory decorative coatings pigmented to a red or orange color by the use of cadmium solfoselenide or cadmium selenide ceramic pigments.

Table I summarizes the constituents present in my improved glaze compositions, and the ranges in which those constituents should be present under circumstances wherein maximum resistance to the action of alkaline agents without sacrifice of maturing temperature and without undue increase in coefficient of expansion is essential.

TABLE I

*Calculated composition of improved glaze compositions*

|  | Per cent |
|---|---|
| Lead oxide | 35–55 |
| Silica | 25–40 |
| Zirconium dioxide | 1–9 |
| Alkali metal fluoride | 1–9 |
| Alkali metal oxide | 0–5 |
| Boric oxide | 0–10 |

The zirconia ($ZrO_2$) is melted with the other ingredients of the batch to form a clear homogeneous solution during the preparation of the frit. The alkali metal fluoride is either lithium fluoride, sodium fluoride, potassium fluoride, or a mixture of two or more of these fluorides. Similarly, the alkali metal oxide, which need not be present but may be present in amounts up to 5%, is an oxide of lithium, sodium, potassium, or mixtures of two or more of these oxides. As previously pointed out, the alkali metal, whether introduced as fluoride or oxide, or as both fluoride and oxide, must be one or more of those having an atomic weight below 40. It may be remarked that I do not know definitely whether the fluorine introduced is present as lead or alkali metal fluoride, or in the form of fluosilicate, but it is conveniently given in the calculated composition as an alkali metal fluoride. Boric oxide need not be present, but if present the amount will not exceed 10% by weight, based on the total weight of the glaze composition.

Wide variations of the various constituents of the flux within the above range are possible without sacrificing the desirable characteristics of high resistivity to the action of alkaline agents at relatively low maturing temperatures. Thus, the zirconium dioxide constituent may be increased within the range given, generally larger amounts of zirconia tending to increase the resistance of the glaze to the action of alkalies. However, if the content of zirconium dioxide is too great, it may interfere with the stability of titanium dioxide when the latter oxide is added as a mill addition during the milling of the glaze composition in order to function as an opacifying agent in the decorative coating applied to the article decorated.

The sum of the alkali metal oxide and alkali metal fluoride contents may be regulated in order to adjust the coefficient of expansion of the glaze within any desired range. Increasing the ratio of alkali metal fluoride content to alkali metal oxide content is beneficial in increasing alkali resistance, but may somewhat reduce the resistivity of the glazes to the action of acids. A high ratio of alkali metal fluoride to alkali metal oxide is also beneficial to the stability of some pigments, such as the cadmium red pigments, but may be detrimental to the stability of others, particularly to opacifying agents such as titanium dioxide white opacifier. In referring to alkali metal fluoride and alkali metal oxide I of course mean the compounds of those alkali metals having an atomic weight below 40.

Generally it is preferred to utilize sodium as the only alkali metal constituent, although lithium and potassium oxides and fluorides, either alone or in admixture with other of the specified alkali metal compounds, may be used. By virtue of the relative cheapness of its compounds, as well as to secure perfect matching of expansion coefficient with commercial glasses, I prefer to use sodium fluoride and sodium oxide as the preferred alkali metal constituents of my glaze compositions.

It is preferred to have present in the low-melting enamel compositions of high alkali resistance a certain percentage of boric oxide, not exceeding 10% by weight based on the total weight of the composition, for, surprisingly enough, within the composition range described, amounts of boric oxide up to 10% by weight serve to render the resulting enamel more resistant to the action of acids. However, where resistivity to the action of acids is of no particular importance, boric oxide may be omitted from my improved glaze composition. If augmented resistivity to the action of acids is essential, as under certain circumstances the resistivity of the glaze to the action of both alkaline agents and acids must be increased, I prefer to include from 1 to 5% of titanium dioxide ($TiO_2$), the amount being by weight based on the total weight of the glaze composition. The titania, as is now understood in the art, must be melted in with the glaze composition to form a clear and homogeneous solution during the preparation of the glaze in order that the resulting enamel may possess the characteristic enhanced resistivity to the action of acids.

Additional oxidic ingredients may be present in my improved glaze compositions. For example, cadmium oxide in amounts up to 5% may be present in order to promote the brightness of cadmium red pigments if such pigments are present. Such addition of cadmium oxide to the flux batch of a lead-bearing flux for the purpose of promoting brightness of cadmium red pigments has been known in the art since the disclosure of Huber and Felton in U. S. Patent 1,673,679. Other oxides may be added to the batch before melting for special purposes as, for example, cobalt oxide may be present if a blue glaze is desired.

In preparing my improved glaze compositions no special precautions are necessary except to insure complete dissolving of the zirconium dioxide, as evidenced by the clarity of the melt. The batch is prepared by selecting raw materials which, when melted, will introduce the constituents given in the calculated composition of my improved enamels as tabulated in Table I. Thus, raw materials which decompose to yield oxides or fluorides in the melt are selected. While the fluorine is represented as alkali metal fluoride, the fluorine may of course be introduced as lead fluoride, or in the form of other fluorine compounds.

The batch composition is melted to a clear, homogeneous liquid, care being taken to make sure that the zirconia is substantially completely dissolved. To determine this fact, samples of the melt may be taken from time to time and examined to insure a clear, homogeneous character. The molten mass is then fritted, either by pouring into water or otherwise. In accordance with the usual practice, the frit composition is then milled, either in a ball mill or otherwise, in order to secure the finely ground base glaze composition. During the milling pigmentary materials and/or opacifying agents may be added, if the resulting glaze composition is to be colored or opaque. Any of the usual opacifying agents may of course be used, either the titanium dioxide previously specified, or other agents added in the mill to produce opacity. The improved glazes may contain other addition agents and other ingredients normally present in glaze compositions intended for application to glassware article.

As examples of batch compositions which may be melted and fritted to produce my improved glaze compositions, Table II lists the various constituents and the amounts which should be present in sixteen typical batch compositions. In this table all parts given are by weight. It should be understood, of course, that I am not limited to these ingredients as sources of the various oxides present in my improved glazes, but may utilize other compounds which, when melted, will yield the desired oxides.

TABLE II

Batch compositions

| | Batch 1 | Batch 2 | Batch 3 | Batch 4 | Batch 5 | Batch 6 | Batch 7 | Batch 8 | Batch 9 | Batch 10 | Batch 11 | Batch 12 | Batch 13 | Batch 14 | Batch 15 | Batch 16 |
|---|---|---|---|---|---|---|---|---|---|---|---|---|---|---|---|---|
| Red lead, $Pb_3O_4$ | 43.3 | 40.5 | 40.3 | 37.2 | 37.8 | 52.4 | 42.4 | 37.5 | 42.8 | 37.2 | 42.5 | 40.6 | 47.4 | 48.7 | 43.4 | 43.4 |
| Flint, $SiO_2$ | 28.8 | 31.8 | 20.1 | 18.6 | 25.2 | 26.2 | 21.2 | 25.0 | 21.5 | 24.9 | 24.2 | 23.3 | 35.3 | 23.7 | 24.8 | 24.8 |
| Sodium zirconium silicate, (14% $Na_2O$, 29% $SiO_2$, 55% $ZrO_2$) | 6.7 | 4.0 | 14.8 | 12.4 | 10.1 | 6.1 | 11.4 | 11.2 | 11.4 | 11.2 | 10.3 | 9.9 | 5.4 | 7.0 | 9.9 | 10.6 |
| Sodium fluoride, NaF | 2.4 | 4.6 | 5.4 | 3.7 | 6. | 1.3 | 3.9 | 6.3 | 3.2 | 6.2 | 6.1 | 6.4 | 5.8 | | 6.8 | |
| Sodium carbonate, $Na_2CO_3$ | 5.8 | 5.8 | 1.3 | 3.7 | 1.7 | 4.8 | | 1.6 | 3.2 | | 1.5 | | 1.7 | 7.0 | | |
| Lithium carbonate, $Li_2CO_3$ | | | | | | | 0.9 | | | | | | | | | 2.2 |
| Potassium carbonate, $2K_2CO_3.3H_2O$ | | | | | | | | | | | 2.2 | | | | | |
| Boric acid, $H_3BO_3$ | 5.8 | 8.1 | 12.1 | 17.3 | 10.1 | 5.3 | 12.7 | 11.2 | 12.9 | 11.2 | 5 | 12.8 | | 5.6 | 8.7 | 8.7 |
| Titanium dioxide, $TiO_2$ | 2.9 | 2.6 | 3.0 | 4.3 | 5.0 | | 4.3 | 4.4 | 5.0 | 4.3 | 4.2 | 3.2 | 3.4 | 2.8 | 4.3 | 4.4 |
| Cadmium oxide, CdO | 4.3 | 2.6 | 3.0 | 2.8 | 3.8 | 3.9 | 3.2 | 2.8 | | 2.8 | 2.7 | 2.6 | 1.0 | 1.0 | 0.9 | 2.8 |
| Ammonium bifluoride, $NH_4HF_2$ | | | | | | | | | | | | 1.2 | | | 1.2 | 3.1 |
| Lead fluoride, $PbF_2$ | | | | | | | | | | | | | | 4.2 | | |

When melted, these compositions will result in fluxes having the calculated compositions specified in Table III. These percentages are by weight, based on the total weight of the flux. Fluorine has been expressed as alkali metal fluoride.

TABLE III

*Calculated melted flux compositions produced by melting the batches listed in Table II*

|  | Flux 1 | Flux 2 | Flux 3 | Flux 4 | Flux 5 | Flux 6 | Flux 7 | Flux 8 | Flux 9 | Flux 10 | Flux 11 | Flux 12 | Flux 13 | Flux 14 | Flux 15 | Flux 16 |
|---|---|---|---|---|---|---|---|---|---|---|---|---|---|---|---|---|
| PbO | 45.0 | 42.5 | 42.4 | 40.4 | 39.3 | 54.2 | 44.6 | 39.1 | 45.5 | 39.0 | 43.9 | 42.9 | 47.2 | 55.1 | 44.9 | 46.1 |
| SiO$_2$ | 32.7 | 35.4 | 26.3 | 24.7 | 30.0 | 29.7 | 26.4 | 30.2 | 27.0 | 30.2 | 28.8 | 28.3 | 37.6 | 27.5 | 29.3 | 30.3 |
| ZrO$_2$ | 3.9 | 2.4 | 8.8 | 7.6 | 6.0 | 3.5 | 6.8 | 6.7 | 6.9 | 6.7 | 6.0 | 5.8 | 3.0 | 4.1 | 5.8 | 6.3 |
| NaF | 2.6 | 4.9 | 5.8 | 4.1 | 6.7 | 1.4 | 4.2 | 6.8 | 3.5 | 6.7 | 6.5 | 8.9 | 5.9 | 1.5 | 9.1 | 2.4 |
| LiF |  |  |  |  |  |  |  |  |  |  |  |  |  |  |  | 1.8 |
| Na$_2$O | 4.6 | 4.3 | 3.0 | 4.4 | 2.6 | 3.9 | 1.7 | 2.7 | 3.7 | 1.7 | 2.4 | 0.1 | 1.8 | 4.3 | 0.1 |  |
| Li$_2$O |  |  |  |  |  |  | 0.4 |  |  |  |  |  |  |  |  |  |
| K$_2$O |  |  |  |  |  |  |  |  |  | 1.4 |  |  |  |  |  |  |
| B$_2$O$_3$ | 3.5 | 4.9 | 7.3 | 10.9 | 6.1 | 3.2 | 7.8 | 6.8 | 8.0 | 6.7 | 5.1 | 7.8 |  | 3.4 | 5.2 | 5.3 |
| TiO$_2$ | 3.1 | 2.8 | 3.2 | 4.8 | 5.3 |  | 4.6 | 4.7 | 5.4 | 4.6 | 4.4 | 3.4 | 3.5 | 3.0 | 4.6 | 4.8 |
| CdO | 4.6 | 2.8 | 3.2 | 3.1 | 4.0 | 4.1 | 3.5 | 3.0 |  | 3.0 | 2.9 | 2.8 | 1.0 | 1.1 | 1.0 | 3.0 |

As previously stated, although no rigid specifications as to melting time and temperature are required in preparing my glaze compositions, it is necessary to conduct the melting under conditions such that a substantial part, preferably substantially all, of the zirconium compounds dissolve in the melt. Undissolved zirconia is not necessarily detrimental, since the undissolved portion suspended in the melt acts as an opacifier, if opaque enamels are being prepared, but undissolved zirconia does not augment alkali resistance.

The resulting enamel compositions may be pigmented with the usual ceramic pigments. Thus, for example, such an enamel composition as flux 11 may be pigmented by the addition of a yellow glass enamel pigment such as cadmium sulfide. This may be done by milling, for example, ninety parts of this frit composition with ten parts of cadmium sulfide. This yields a yellow glass enamel suitable for application to articles of glassware to be decorated. By actual test this enamel remained on the glassware article under the attack of strong alkali approximately 50% longer than a similar enamel composition of a type now known to the art having a comparable maturing temperature.

Similarly, a white glass enamel composition highly resistant to the action of alkaline agents may be prepared by milling ninety parts of flux 8 with ten parts of titanium dioxide opacifying agent. Glass articles decorated with this white glass enamel, when subjected to the action of strong alkalies, especially at elevated temperatures, retained the white decorative enamel coating for approximately 50% longer than a similar commercially obtainable glaze of comparable maturing temperature.

To those skilled in the art, many modifications and widely different embodiments of my invention in the general field of decorating ceramic articles will be readily suggested. The invention is therefore not to be restricted to the precise proportions, procedures, or conditions given herein as illustrative of my preferred embodiments, but its scope is to be construed in accordance with the prior art and appended claims.

I claim:

1. An alkali-resistant, high lead content glaze composition suitable for decorating glassware and maturing below about 1150° F. to a glossy, decorative surface coating, said glaze composition comprising lead oxide, silica, zirconium dioxide, and an alkali metal fluoride selected from the group which consists of the fluorides of lithium, sodium, and potassium; said zirconium dioxide being present in amounts ranging from 1 to 9% by weight based on the total weight of said glaze composition, and being melted into said glaze composition as a homogeneous constituent thereof.

2. An alkali-resistant, high lead content glaze composition suitable for decorating glassware and maturing below about 1150° F. to a glossy, decorative surface coating, said glaze composition comprising lead oxide, silica, zirconium dioxide, an alkali metal fluoride selected from the group which consists of the fluorides of lithium, sodium, and potassium, and an alkali metal oxide selected from the group which consists of the oxides of the metals lithium, sodium, and potassium, said zirconium dioxide being present in amounts ranging from 1 to 9% by weight, based on the total weight of said composition, and being melted into said composition as a homogeneous constituent thereof.

3. An alkali-resistant, high lead content glaze composition suitable for decorating glassware and maturing below about 1150° F. to a glossy, decorative surface coating, said glaze composition comprising lead oxide, silica, sodium oxide, zirconium dioxide, and an alkali metal fluoride selected from the group which consists of the fluorides of lithium, sodium, and potassium, said zirconium dioxide being present in amounts ranging from 1 to 9% by weight, based on the total weight of said glaze composition, and being melted into said glaze composition as a homogeneous consituent thereof.

4. An alkali-resistant, high lead content glaze composition suitable for decorating glassware and maturing below about 1150° F. to a glossy, decorative surface coating, said glaze composition comprising lead oxide, silica, boric oxide, zirconium dioxide, an alkali metal fluoride selected from the group which consists of the fluorides of lithium, sodium, and potassium, and an alkali metal oxide selected from the group which consists of the oxides of lithium, sodium, and potassium, said zirconium dioxide being present in amounts ranging from 1 to 9% by weight, based on the total weight of said glaze composition, and being melted into said glaze composition as a homogeneous constituent thereof.

5. An alkali-resistant, high lead content glaze composition suitable for decorating glassware and maturing below about 1150° F. to a glossy, decorative surface coating, said glaze composition comprising lead oxide, silica, boric oxide, sodium oxide, zirconium dioxide, and an alkali metal fluoride selected from the group which consists of the fluorides of lithium, sodium, and potassium, said zirconium dioxide being present in amounts ranging from 1 to 9% by weight, based on the total weight of said glaze composition, and being melted into said glaze composition as a homogeneous constituent thereof.

6. A pigmented, alkali-resistant, high lead content glaze composition suitable for decorating glassware and maturing below about 1150° F. to a glossy, decorative surface coating, said composition comprising a ceramic pigment and a lead frit which comprises lead oxide, silica, zirconium dioxide, and an alkali metal fluoride selected from the group which consists of the fluorides of lithium, sodium, and potassium, said zirconium dioxide being present in amounts ranging from 1 to 9% by weight, based on the total weight of said composition, and being melted into said lead frit as a homogeneous constituent thereof.

7. A pigmented, alkali-resistant, high lead content glaze composition suitable for decorating glassware and maturing below about 1150° F. to a glossy, decorative surface coating, said glaze composition comprising a ceramic pigment and a lead frit which comprises lead oxide, silica, zirconium dioxide, an alkali metal fluoride selected from the group which consists of the fluorides of lithium, sodium, and potassium, and an alkali metal oxide selected from the group which consists of the oxides of lithium, sodium, and potassium, said zirconium dioxide being present in amounts ranging from 1 to 9% by weight, based on the total weight of said composition, and being melted into said lead frit as a homogeneous constituent thereof.

8. A pigmented, alkali-resistant, high lead content glaze composition suitable for decorating glassware and maturing below about 1150° F. to a glossy, decorative surface coating, said glaze composition comprising a ceramic pigment and a lead frit which comprises lead oxide, silica, zirconium dioxide, boric oxide, an alkali metal fluoride selected from the group which consists of the fluorides of lithium, sodium, and potassium, and an alkali metal oxide selected from the group which consists of the oxides of lithium, sodium, and potassium, said zirconium dioxide being present in amounts ranging from 1 to 9% by weight, based on the total weight of said composition, and being melted into said lead frit to form a homogeneous constituent thereof.

9. An opaque, alkali-resistant, high lead content glaze composition suitable for decorating glassware and maturing below about 1150° F. to an opaque, glossy, decorative surface coating, said glaze composition comprising an enamel opacifying agent and a lead frit which comprises lead oxide, silica, zirconium dioxide, and an alkali metal fluoride selected from the group which consists of the fluorides of lithium, sodium, and potassium, said zirconium dioxide being present in amounts ranging from 1 to 9% by weight, based on the total weight of said composition, and being melted into said lead frit as a homogeneous constituent thereof.

10. An opaque, alkali-resistant, high lead content glaze composition suitable for decorating glassware and maturing below about 1150° F. to an opaque, glossy, decorative surface coating, said glaze composition comprising an enamel opacifying agent and a lead frit which comprises lead oxide, silica, zirconium dioxide, an alkali metal fluoride selected from the group which consists of the fluorides of lithium, sodium, and potassium, and an alkali metal oxide selected from the group which consists of the oxides of lithium, sodium, and potassium, said zirconium dioxide being present in amounts ranging from 1 to 9% by weight, based on the total weight of said composition, and being melted into said composition as a homogeneous constituent thereof.

11. An opaque, alkali-resistant, high lead content glaze composition suitable for decorating glassware and maturing below about 1150° F. to an opaque, glossy, decorative surface coating, said glaze composition comprising an enamel opacifying agent and a lead frit which comprises lead oxide, silica, zirconium dioxide, boric oxide, an alkali metal fluoride selected from the group which consists of the fluorides of lithium, sodium, and potassium, and an alkali metal oxide selected from the group which consists of the oxides of lithium, sodium, and potassium, said zirconium dioxide being present in amounts ranging from 1 to 9% by weight, based on the total weight of said composition, and being melted into said lead frit to form a homogeneous constituent thereof.

12. An alkali-resistant, high lead content glaze composition suitable for decorating glassware and maturing below about 1150° F. to a glossy, decorative surface coating, said glaze composition comprising lead oxide in amounts ranging from 35 to 55%, silica in amounts ranging from 25 to 40%, zirconium dioxide, and an alkali metal fluoride selected from the group consisting of the fluorides of lithium, sodium, and potassium, said zirconium dioxide being present in amounts ranging from 1 to 9% as a melted-in, homogeneous constituent of said glaze, all said percentages being by weight, based on the total weight of said glaze composition.

13. An alkali-resistant, high lead content glaze composition suitable for decorating glassware and maturing below about 1150° F. to a glossy, decorative surface coating, said glaze composition comprising lead oxide in amounts ranging from 35 to 55%, silica in amounts ranging from 25 to 40%, zirconium dioxide, an alkali metal fluoride selected from the group which consists of the fluorides of lithium, sodium, and potassium, and an alkali metal oxide selected from the group which consists of the oxides of lithium, sodium, and potassium, said zirconium dioxide being present in amounts ranging from 1 to 9% and constituting a melted-in, homogeneous constituent of said glaze composition, all said percentages being by weight, based on the total weight of said glaze composition.

14. An alkali-resistant, high lead content glaze composition suitable for decorating glassware and maturing below about 1150° F. to a glossy, decorative surface coating, said glaze composition comprising lead oxide in amounts ranging from 35 to 55%, silica in amounts ranging from 25 to 40%, boric oxide, zirconium dioxide, an alkali metal fluoride selected from the group which consists of the fluorides of lithium, sodium, and potassium, and an alkali metal oxide selected from the group which consists of the oxides of lithium, sodium, and potassium, said zirconium dioxide being present in amounts ranging from 1 to 9% as a homogeneous, melted-in constituent of said glaze composition, all said percentages being by weight, based on the total weight of said glaze composition.

15. An alkali-resistant, high lead content glaze composition suitable for decorating glassware and maturing below about 1150° F. to a glossy, decorative surface coating, said glaze composition comprising lead oxide present in amounts ranging from 35 to 55%, silica present in amounts ranging from 25 to 40%, zirconium dioxide present in amounts ranging from 1 to 9%, and an alkali metal fluoride selected from the group which consists of the fluorides of lithium, sodium, and potassium present in amounts ranging from 1 to 9%, said zirconium dioxide constituting a melted-in, homogeneous constituent of said glaze, all said percentages being by weight, based on the total weight of said glaze composition.

16. An alkali-resistant, high lead content glaze composition suitable for decorating glassware and maturing below about 1150° F. to a glossy, decorative surface coating, said glaze composition having the following calculated composition:

| | Per cent |
|---|---|
| Lead oxide | 35–55 |
| Silica | 25–40 |
| Zirconium dioxide | 1– 9 |
| Alkali metal fluoride | 1– 9 |
| Alkali metal oxide | 0– 5 | said alkali metal compounds being those of an alkali metal having an atomic weight below 40, and said zirconium dioxide being melted in, together with the other ingredients comprising said lead glaze composition.

17. An alkali-resistant, high lead content glaze composition suitable for decorating glassware and maturing below about 1150° F. to a glossy, decorative surface coating, said glaze composition having the following calculated composition:

| | Per cent |
|---|---|
| Lead oxide | 35–55 |
| Silica | 25–40 |
| Zirconium dioxide | 1– 9 |
| Alkali metal fluoride | 1– 9 |
| Alkali metal oxide | 0– 5 |
| Boric oxide | 0–10 | said alkali metal compounds being those of an alkali metal having an atomic weight below 40, and said zirconium dioxide being melted in, together with the other ingredients comprising said lead glaze composition.

18. A pigmented, alkali-resistant, high lead content glaze composition suitable for decorating glassware and maturing below about 1150° F. to a glossy, decorative surface coating, said glaze composition comprising a ceramic pigment and a lead frit having the following calculated composition:

| | Per cent |
|---|---|
| Lead oxide | 35–55 |
| Silica | 25–40 |
| Zirconium dioxide | 1– 9 |
| Alkali metal fluoride | 1– 9 |
| Alkali metal oxide | 0– 5 |
| Boric oxide | 0–10 | said alkali metal compounds being those of an alkali metal having an atomic weight below 40, and said zirconium dioxide constituting a melted-in constituent of said lead frit.

19. An opaque, alkali-resistant, high lead content glaze composition suitable for decorating glassware and maturing below about 1150° F. to a glossy, decorative surface coating, said glaze composition comprising an enamel opacifying agent and a lead frit having the following calculated composition:

| | Per cent |
|---|---|
| Lead oxide | 35–55 |
| Silica | 25–40 |
| Zirconium dioxide | 1– 9 |
| Alkali metal fluoride | 1– 9 |
| Alkali metal oxide | 0– 5 |
| Boric oxide | 0–10 | said alkali metal compounds being those of an alkali metal having an atomic weight below 40, and said zirconium dioxide constituting a melted-in constituent of said lead frit.

20. A decorated glassware article decorated with the glaze composition defined in claim 1.

ALDEN J. DEYRUP.

CERTIFICATE OF CORRECTION.

Patent No. 2,338,099.  January 4, 1944.

ALDEN J. DEYRUP.

It is hereby certified that error appears in the printed specification of the above numbered patent requiring correction as follows: Page 1, first column, line 23, for "enamed" read --enamel--; page 3, Table II, Batch 5, opposite "Sodium fluoride, NaF", for "6." read --6.3--; and that the said Letters Patent should be read with this correction therein that the same may conform to the record of the case in the Patent Office.

Signed and sealed this 15th day of February, A. D. 1944.

(Seal)

Henry Van Arsdale,
Acting Commissioner of Patents.